US007106514B2

(12) United States Patent
Murata et al.

(10) Patent No.: US 7,106,514 B2
(45) Date of Patent: Sep. 12, 2006

(54) OPTICAL TUNABLE FILTER AND METHOD FOR MANUFACTURING THE OPTICAL TUNABLE FILTER

(75) Inventors: Akihiro Murata, Hokuto (JP); Ryosuke Nakamura, Chino (JP); Shinichi Kamisuki, Shiojiri (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/946,621

(22) Filed: Sep. 21, 2004

(65) Prior Publication Data

US 2005/0094297 A1 May 5, 2005

(30) Foreign Application Priority Data

Sep. 22, 2003 (JP) ............................ 2003-330619

(51) Int. Cl.
*G02B 27/00* (2006.01)

(52) U.S. Cl. ...................... 359/578; 359/587; 359/589; 359/585

(58) Field of Classification Search ................ 359/578, 359/581, 585, 589, 587
See application file for complete search history.

(56) References Cited

U.S. PATENT DOCUMENTS 5,142,414 A * 8/1992 Koehler ...................... 359/578
6,341,039 B1 1/2002 Flanders et al.
6,438,149 B1 * 8/2002 Tayebati et al. ......... 372/45.01
7,012,752 B1 * 3/2006 Choi et al. .................. 359/578
2005/0146241 A1 * 7/2005 Wan .......................... 310/309

FOREIGN PATENT DOCUMENTS

JP 06-007100 1/1994
JP 321323 7/2001
JP 2002-174721 6/2002

* cited by examiner

*Primary Examiner*—Fayez G. Assaf
(74) *Attorney, Agent, or Firm*—Harness, Dickey & Pierce, P.L.C.

(57) ABSTRACT

An optical tunable filter includes a first substrate 3 having a light transmitting property which includes a movable portion 31, a second substrate 20 having a light transmitting property which is provided so as to be opposed to the first substrate, a first gap 21 and a second gap 22 which are respectively provided between the movable portion 31 and the second substrate 20, an interference portion which causes interference of incident light between the movable portion 31 and the second substrate 20 through the second gap 22, and a driving portion which changes a distance of the second gap 22 by displacing the movable portion 31 with respect to the second substrate 20 using the first gap 21. This makes it possible to provide an optical tunable filter having a simpler structure and a smaller size, which can be manufactured through a simplified manufacturing process without using a release hole and can achieve stable driving of a movable portion, and a method for manufacturing such an optical tunable filter.

16 Claims, 8 Drawing Sheets

OPTICAL TUNABLE FILTER AND METHOD FOR MANUFACTURING THE OPTICAL TUNABLE FILTER

BACKGROUND OF THE INVENTION

1. Field of the Invention

The present invention relates to an optical tunable filter and a method for manufacturing the optical tunable filter.

2. Description of the Prior Art

As for patents related to the optical tunable filter according to the present invention, the following documents can be mentioned.

<Filter Formed by Surface Micro-Machining>

In a conventional optical tunable filter, the thickness of a variable gap is controlled only by the thickness of a sacrifice layer. According to such a method, variations occur in the thickness of the variable gap depending on conditions for forming the sacrifice layer, thus resulting in a problem that a uniform Coulomb force is not generated between a thin film and a drive electrode so that stable driving cannot be achieved. Further, since a conventional optical tunable filter has a structure in which a movable portion protrudes from the surface of a substrate, the optical tunable filter is large in thickness (see Japanese Patent Laid-open No. 2002-174721, for example).

<Filter Using SOI Wafer>

On the other hand, U.S. Pat. No. 6,341,039 discloses a filter having a variable gap formed using an $SiO_2$ layer of an SOI (Silicon on Insulator) wafer as a sacrifice layer. By using such an $SiO_2$ layer of an SOI wafer as a sacrifice layer, it is possible to form a variable gap with high accuracy. In this filter, however, an insulating structure is not provided between a drive electrode and a movable portion, thus resulting in a problem that the movable portion and the drive electrode stick together when a large electrostatic attraction is generated therebetween (see U.S. Pat. No. 6,341,039, for example).

<Problem Common to Both Types of Filter>

In both types of filter, the sacrifice layer is ultimately released to form the variable gap. Therefore, a release hole is necessarily provided in the filter in order to feed a liquid for releasing to the sacrifice layer. This causes a problem that an area where Coulomb force acts is reduced so that a voltage for driving is increased. Further, if the variable gap is small, a phenomenon, in which the thin film and the drive electrode substrate stick together due to the surface tension of water, occurs when the sacrifice layer is released (that is, a phenomenon referred to as “sticking” occurs). Under the circumstances, there is a demand for a filter which can be manufactured without releasing a sacrifice layer.

SUMMARY OF THE INVENTION

It is therefore an object of the present invention to provide an optical tunable filter having a simpler structure and a smaller size, which can be manufactured through a simplified manufacturing process without using a release hole and can achieve stable driving of a movable portion, and a method for manufacturing such an optical tunable filter.

In order to achieve the object, the present invention is directed to an optical tunable filter, comprising: a first substrate having a light transmitting property, the first substrate including a movable portion; a second substrate having a light transmitting property, the second substrate being provided so as to be opposed to the first substrate; a first gap and a second gap which are respectively provided between the movable portion and the second substrate; an interference portion which causes interference of incident light between the movable portion and the second substrate through the second gap; and a driving portion for changing a distance of the second gap by displacing the movable portion with respect to the second substrate using the first gap.

According to the present invention having the above structure, it is possible to provide an optical tunable filter having a simpler structure and a smaller size. Further, such an optical tunable filter can be manufactured easily without using a release hole and can realize stable driving of a movable portion.

In the present invention, it is preferred that the second substrate has a surface facing the movable portion, in which the surface of the second substrate is formed with a first concave portion corresponding to the first gap and a second concave portion corresponding to the second gap, and the second concave portion is formed so as to be deeper than the first concave portion.

According to this feature, since the first gap for displacing the movable portion and the second gap for interfering lights are provided by utilizing the same substrate, it possible to provide an optical tunable filter which has a simpler structure and a smaller size and which can be manufactured through a simplified manufacturing process.

In the present invention, it is also preferred that the first concave portion is provided around the second concave portion so as to be continuous with the second concave portion. This arrangement makes it possible to transmit light efficiently and drive the movable portion stably.

Further, it is also preferred that the driving portion is constructed to displace the movable member Coulomb force. This makes it possible to drive the movable portion stably.

Furthermore, it is also preferred that the second substrate has a drive electrode, and the drive electrode is provided on a surface of the second substrate corresponding to the first gap. This makes it possible to drive the movable portion more stably.

Moreover, it is also preferred that the first gap and the second gap are formed by an etching method. This makes it possible to form the first gap and the second gap with high accuracy.

Moreover, it is also preferred that the first substrate is made of silicon. This makes it possible to simplify the structure and the manufacturing process.

Moreover, it is also preferred that the movable portion has a substantially circular shape in a plan view. This makes it possible to drive the movable portion efficiently.

Moreover, it is also preferred that the second substrate is made of glass. This makes it possible to form the substrate with high accuracy, and thereby enabling to provide an optical tunable filter through which light can be transmitted efficiently.

In this case, it is preferred that the glass contains alkali metal. This makes it possible to further easily manufacture the optical tunable filter and firmly bond the first substrate and the second substrate with high adhesion.

Further, in the present invention, it is preferred that the movable portion has a surface corresponding to the second gap, in which a first reflective film is provided on the surface of the movable portion and a second reflective film is provided on the surface the second substrate. This makes it possible to reflect light efficiently.

In this case, it is preferred that each of the first reflective film and the second reflective film is formed from a multiplayer film. This makes it possible to easily change a film thickness, thereby enabling to simplify the manufacturing process of the reflecting film.

In this optical tunable filter, it is preferred that the first reflective film has an insulating property. This makes it possible to provide reliable insulation between the movable portion and the second substrate with a simple structure.

Furthermore, in the present invention, it is also preferred that an antireflective film is provided on at least one of the other surface of the movable portion and the other surface of the second substrate. This makes it possible to suppress the reflection of light and transmit light efficiently.

Moreover, it is also preferred that the antireflective film is formed from a multiplayer film. This makes it possible to easily change a film thickness, and thereby enabling to realize a simplified manufacturing process of the antireflective film.

Moreover, it is also preferred that the second substrate includes a light transmitting portion through which light enters and/or from which light is emitted, the light transmitting portion being provided on the other surface of the second substrate. This makes it possible to transmit light efficiently.

Another aspect of the present invention is directed to a method for manufacturing an optical tunable filter, wherein the optical tunable filter comprises: a first substrate having a light transmitting property, the first substrate including a movable portion; a second substrate having a light transmitting property, the second substrate being provided so as to be opposed to the first substrate; a first gap and a second gap which are respectively provided between the movable portion of the first substrate and the second substrate; an interference portion which causes interference of incident light between the movable portion and the second substrate through the second gap; and a driving portion for changing a distance of the second gap by displacing the movable portion with respect to the second substrate using the first gap, wherein the method is characterized in that the first gap and the second gap are formed by an etching method.

According to this method of the present invention, it is possible to easily manufacture an optical tunable filter and stably drive the movable portion since a release hole is unnecessary in a case of manufacturing the gap for driving the movable portion.

The above and other objects, structures and advantages of the present invention will be more apparent when the following description of the preferred embodiments will be considered taken in conjunction with the accompanying drawings.

DETAILED DESCRIPTION OF THE INVENTION

Hereinafter, an optical tunable filter according to the present invention will be described in detail with reference to a preferred embodiment shown in the appended drawings.

Figure 1:
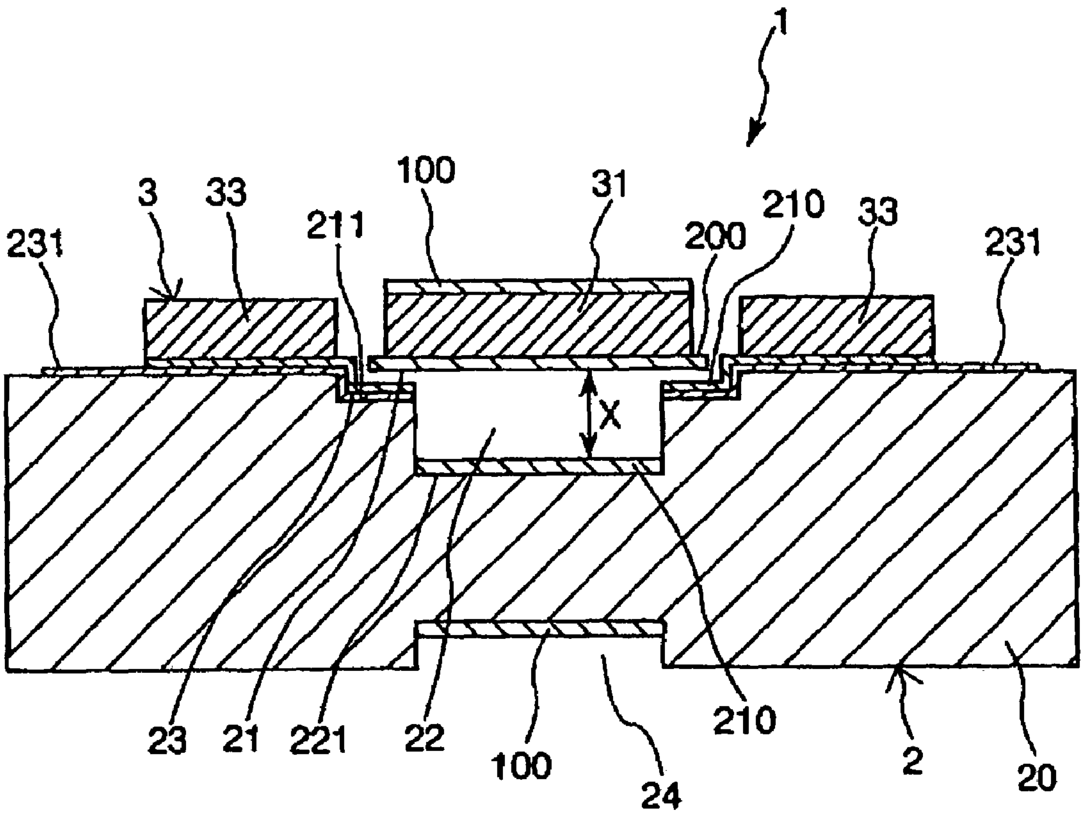
FIG. 1 is a cross-sectional view which shows an embodiment of an optical tunable filter according to the present invention.
Figure 2:
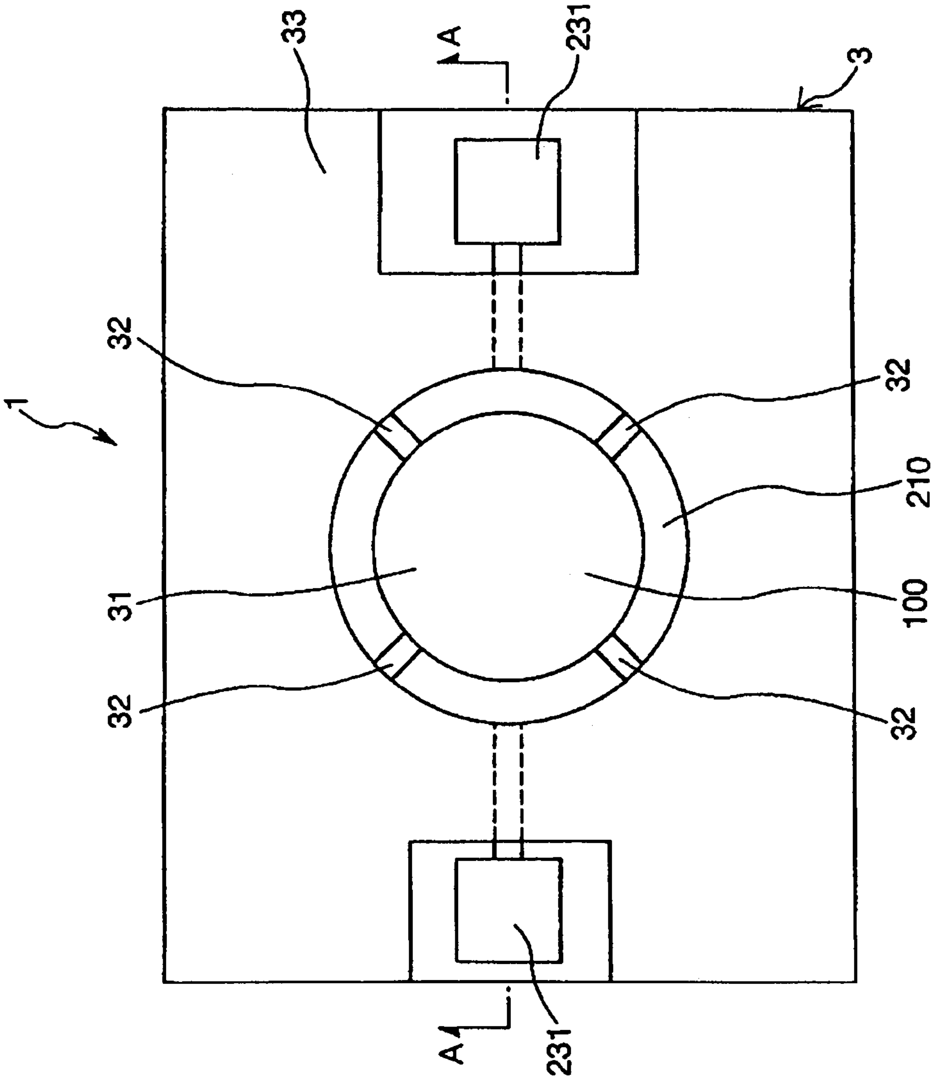
FIG. 2 is a plan view which shows the embodiment of the optical tunable filter according to the present invention.

FIG. 1 is a cross—sectional view taken along the line A-A in FIG. 2, which shows the embodiment of the optical tunable filter according to the present invention, and FIG. 2 is a plan view of the optical tunable filter shown in FIG. 1. In this regard, it is to be noted that, in the following description, the upper side and the lower side in FIG. 1 will be referred to as "upper side" and "lower side", respectively.

As shown in FIG. 1, an optical tunable filter 1 includes a first substrate 3, a base substrate (second substrate) 2 provided so as to be opposed to the first substrate 3, a first gap 21, and a second gap 22. Both of the first gap 21 and the second gap 22 are provided between the first substrate 3 and the base substrate 2. Further, the first substrate 3 includes a movable portion 31, supporting portions 32 which support the movable portion 31 so that the movable portion 31 can be displaced (that is, so that the movable portion 31 can be moved), a current-carrying portion 33 which carries a current to the movable portion 31. The movable portion 31 is provided in the center of the first substrate 3.

The first substrate 3 has conductivity and a light transmitting property. Further, the first substrate 3 is made of silicon (Si). Therefore, the movable portion 31, the supporting portions 32, and the current-carrying portion 33 can be integrally formed. The base substrate 2 includes a base body 20 having a first concave portion 211 and a second concave portion 221, a drive electrode 23, a conductive layer 231, a light entrance portion (that is, a light transmitting portion) 24, an antireflective film 100, and a second reflective film 210.

The base body 20 has a light transmitting property. Examples of the constituent material of the base body 20 include various glass materials such as soda glass, crystalline glass, silica glass, lead glass, potassium glass, borosilicate glass, sodium borosilicate glass, and non-alkali glass, and silicon and the like. Among them, glass containing alkali metal such as sodium (Na) is preferably used, for example.

From such a view point, as the constituent material of the base body 20, soda glass, potassium glass, sodium borosilicate glass, or the like can be used. For example, Pyrex (which is a trademark of Corning Incorporated) glass is preferably used. The thickness of the base body 20 is not limited to any specific value and is appropriately determined according to the constituent material thereof and the purposes of use of the optical tunable filter, but is preferably in the range of about 10 to 2,000 μm, more preferably in the range of about 100 to 1,000 μm.

In the surface of the base body 20, which is a surface of the base body facing the movable portion 31, the first concave portion 211 and the second concave portion 221 which is deeper than the first concave portion 211 are provided. The first concave portion 211 is provided around the second concave portion 221 with the first concave portion 211 being continuous with the second concave portion 221. The outside shape of the first concave portion 211 roughly corresponds to the outside shape of the movable portion 31 (which will be described later in detail), but the dimensions (outside dimensions) of the first concave portion 211 are determined so as to be slightly larger than those of the movable portion 31.

The outside shape of the second concave portion 221 also roughly corresponds to the outside shape of the movable portion 31, but the dimensions of the second concave portion 221 are determined so as to be slightly smaller than those of the movable portion 31. Due to these structures, it is possible for the peripheral part of the movable portion 31 (that is, the outer part of the movable portion 31) to oppose to the first concave portion 211.

In these structures, it is preferred that the first concave portion 211 and the second concave portion 221 are formed by subjecting the surface of the base body 20 to etching, which will be described later in detail. A space provided in the first concave portion 211 can be defined as the first gap 21. Namely, the movable portion 31 and the first concave portion 211 define the first gap 21.

Likewise, a space provided in the second concave portion 221 is defined as the second gap 22. Namely, the movable portion 31 and the second concave portion 221 define the second gap 22. The size of the first gap 21 is not limited to any specific value and is appropriately determined according to the purposes of use of the optical tunable filter, but is preferably in the range of about 0.5 to 20 μm. The size of the second gap 22 is not also limited to any specific value and is appropriately determined according to the purposes of use of the optical tunable filter, but is preferably in the range of about 1 to 100 μM.

In this embodiment, the movable portion 31 is substantially circular in a plan view. This makes it possible to efficiently drive the movable portion 31. The thickness of the movable portion 31 is not limited to any specific value and is appropriately determined according to the constituent material thereof and the purposes of use of the optical tunable filter, but is preferably in the range of about 1 to 500 μm, more preferably in the range of about 10 to 100 μm.

On the surface of the movable portion 31, which is a surface facing the second concave portion 221 (that is, on the lower surface of the movable portion 31), there is provided a first reflective film (HR coating) 200 which efficiently reflects light. On the other hand, on the surface of the movable portion 31 which does not face the second concave portion 221 (that is, on the upper surface of the movable portion 31), there is provided an antireflective film (AR coating) 100 which suppresses reflection of light. It goes without saying that the shape of the movable portion 31 is not limited to one shown in the drawings.

In the roughly center portion of FIG. 2, four supporting portions 32 are provided. These supporting portions 32 have elasticity (flexibility), and are integrally formed with the movable portion 31 and the current-carrying portion 33. The supporting portions 32 are equiangularly spaced (that is, the supporting portions 32 are provided every 90°) along the peripheral surface of the movable portion 31. The movable portion 31 can be freely moved in the up and down direction in FIG. 1. In this regard, it is to be noted that the number of the supporting portion 32 is not necessarily limited to four. For example, the number of the supporting portion 32 may be two, three, or five or more. Further, the shape of the supporting portion 32 is not limited to one shown in the drawing.

The first substrate 3 is bonded to the base substrate 2 through the current-carrying portion 33. The current-carrying portion 33 is connected to the movable portion 31 through the supporting portions 32. The light entrance portion 24 is provided in the lower surface of the base body 20, from which light enters the optical tunable filter 1. On the surface of the light entrance portion 24, the antireflective film 100 is provided.

On the surface of the second concave portion 221, the second reflective film 210 is provided. Further, on the upper surface of the first concave portion 211, there is provided a drive electrode 23 which is continuous with conductive layers 231, 231 in the form of a sheet or film. The conductive layers 231, 231 extend from the drive electrode 23 to the ends of the base body 20, respectively. Furthermore, on the upper surfaces of the drive electrode 23 and the conductive layers 231, 231, the second reflective film 210 is provided.

Each of the drive electrode 23 and the conductive layers 231, 231 is formed of a material having conductivity. Examples of the constituent material of the drive electrode 23 and the conductive layers 231 include: metals such as Cr, Al, Al alloys, Ni, Zn, and Ti; resins in which carbon or titanium is dispersed; silicon such as polycrystalline silicon (polysilicon) and amorphous silicon; silicon nitride; transparent conductive materials such as ITO; and Au. The thickness of each of the drive electrode 23 and the conductive layers 231 is not limited to any specific value and is appropriately determined according to the constituent material thereof and the purposes of use of the optical tunable filter, but is preferably in the range of about 0.1 to 5 μm.

Figure 8:
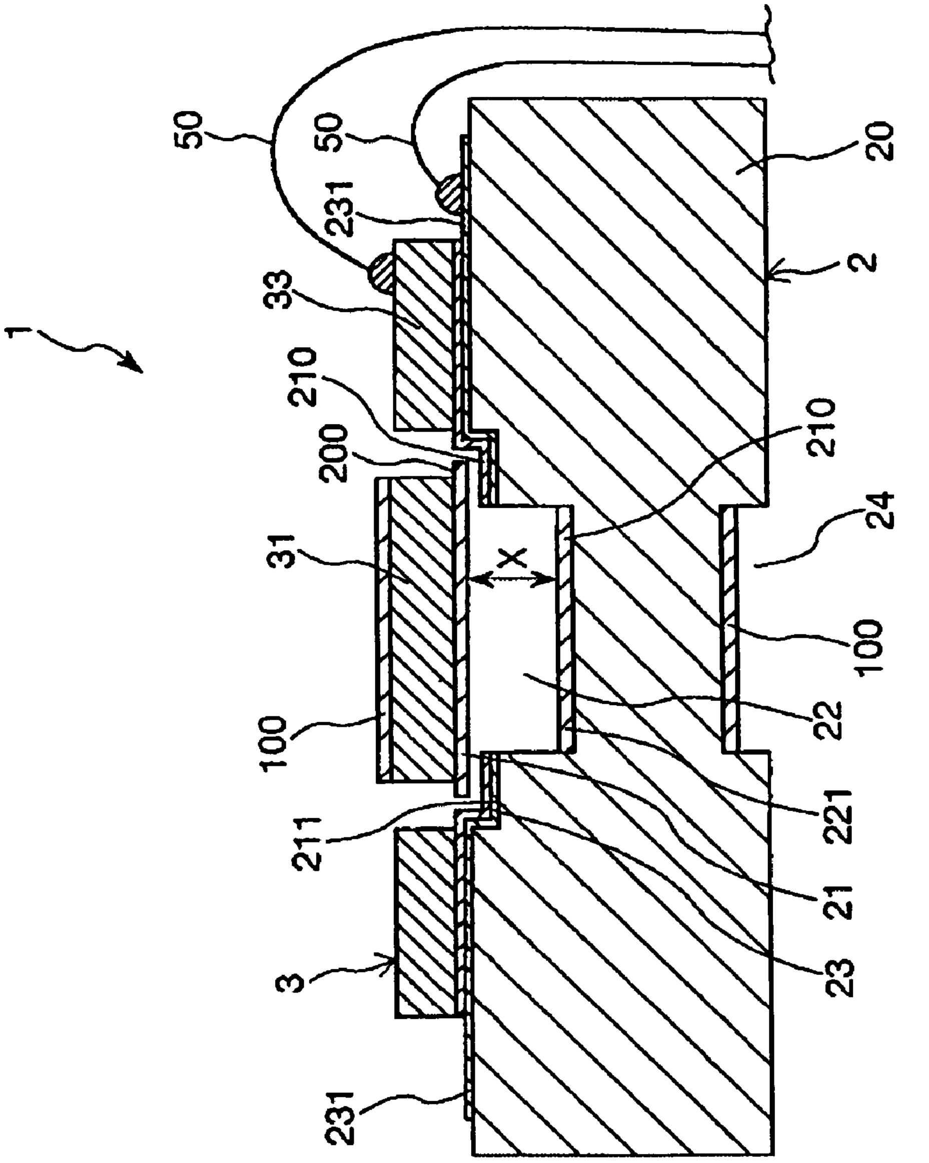
FIG. 8 is a cross-sectional view which shows the optical tunable filter provided with wires in the embodiment of the optical tunable filter according to the present invention.

As shown in FIG. 8, the current-carrying portion 33 and the conductive layer 231 of the optical tunable filter 1 are connected to a circuit board (not shown in the drawings) through wires 50. The wire 50 is connected to each of the current-carrying portion 33 and the conductive layer 231 by the use of a brazing material such as solder, for example. With this arrangement, the current-carrying portion 33 and the conductive layer 231 are connected to a power source (not shown in the drawings) through the wires 50 and the circuit board, thereby enabling a voltage to be applied across the movable portion 31 and the drive electrode 23.

When a voltage is applied across the drive electrode 23 and the movable portion 31, the drive electrode 23 and the movable portion 31 are oppositely charged, and as a result, Coulomb force is generated between them. Then, the movable portion 31 is moved downward due to the Coulomb force and then comes to rest. In this case, for example, by continuously or gradually changing a voltage to be applied, it is possible to move the movable portion 31 to a predetermined position in the up and down direction with respect to the base substrate 2. That is, the distance X can be adjusted (changed) to a predetermined value, thereby enabling light having a predetermined wavelength to be emitted (which will be described later in detail).

The drive electrode 23, the first gap 21, and the peripheral part of the movable portion 31 constitute a main part of a driving portion (actuator) which is driven by Coulomb force.

Each of the first reflective film 200 and the second reflective film 210 of this embodiment has an insulating property. That is, the first reflective film 200 and the second reflective film 210 also serve as insulating films. Therefore, the first reflective film 200 can prevent a short circuit from occurring between the drive electrode 23 and the movable portion 31.

Further, the second reflective film 210 can prevent a short circuit from occurring between the conductive layer 231 and the first substrate 3.

In this embodiment, each of the antireflective film 100, the first reflective film 200, and the second reflective film 210 is formed from a multilayer film. By appropriately setting (adjusting) the thickness of each layer, the number of layers, and the material of each layer, it is possible to form a multilayer film capable of transmitting or reflecting light having a predetermined wavelength (that is, it is possible to form multilayer films having various properties). In this way, the antireflective film 100, the first reflective film 200, and the second reflective film 210 can be easily formed.

Figure 7:
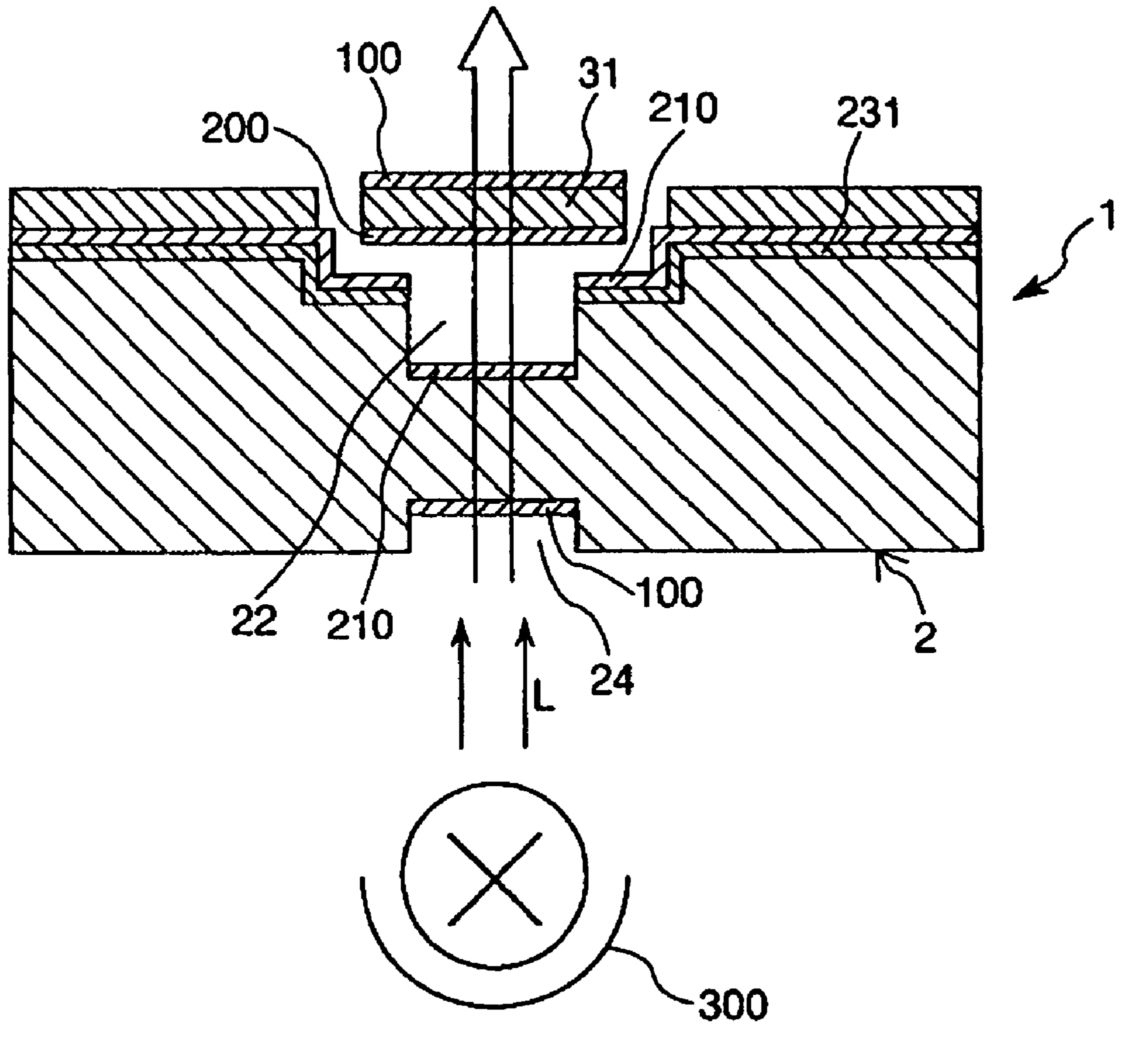
FIG. 7 is a cross-sectional view which shows one example of an operation of the optical tunable filter according to the present invention.

Next, the operation (action) of the optical tunable filter according to the present invention will be described with reference to FIG. 7. As shown in FIG. 7, light L emitted from a light source 300 enters through the light entrance portion 24 provided in the lower surface of the base substrate 2. Specifically, the light L passes through the antireflective film 100, the base substrate 2, and the second reflective film 210, and then enters the second gap 22. The incident light is repeatedly reflected (that is, interference occurs) between the first reflective film 200 and the second reflective film 210. Accordingly, the first reflective film 200 and the second reflective film 210 can suppress the loss of the light L.

Light having a predetermined wavelength corresponding to the distance X (that is, coherent light) obtained as a result of interference of the light L passes through the first reflective film 200, the movable portion 31, and the antireflective film 100, and is then emitted from the upper surface of the movable portion 31.

The optical tunable filter 1 as described above can be used for various purposes. For example, by using the optical tunable filter 1 in an apparatus for measuring the intensity of light corresponding to a predetermined frequency, it is possible to measure such intensity of light easily.

In this embodiment, light enters through the light entrance portion 24, but light may enter through the upper surface of the movable portion 31. In such a case, the light may be emitted from the light entrance portion 24 or the upper surface of the movable portion 31. Further, in this embodiment, light which has entered through the light entrance portion 24 is emitted from the upper surface of the movable portion 31, but light which has entered through the light entrance portion 24 may be emitted from the light entrance portion 24.

Furthermore, in this embodiment, each of the antireflective film 100, the first reflective film 200, and the second reflective film 210 is formed from a multilayer film, but each of them may be formed from a single-layer film. Moreover, in this embodiment, the driving portion has a structure which is driven by Coulomb force, but the present invention is not limited thereto.

Next, a method for manufacturing the optical tunable filter 1 will be described with reference to the step diagrams shown in FIG. 3 to FIG. 6.

<1> First, a transparent substrate (that is a substrate having a light transmitting property) 5 is prepared prior to the manufacture of the optical tunable filter 1. The transparent substrate 5 preferably has a uniform thickness, no distortion, and no flaws. As for the constituent material of the transparent substrate 5, the same materials as described above with reference to the base body 20 can be used. Among them, one having substantially the same thermal expansion coefficient as that of an upper Si layer 73 (which will be described later) is particularly preferable because the transparent substrate 5 is heated upon anodic bonding.

Figure 3:
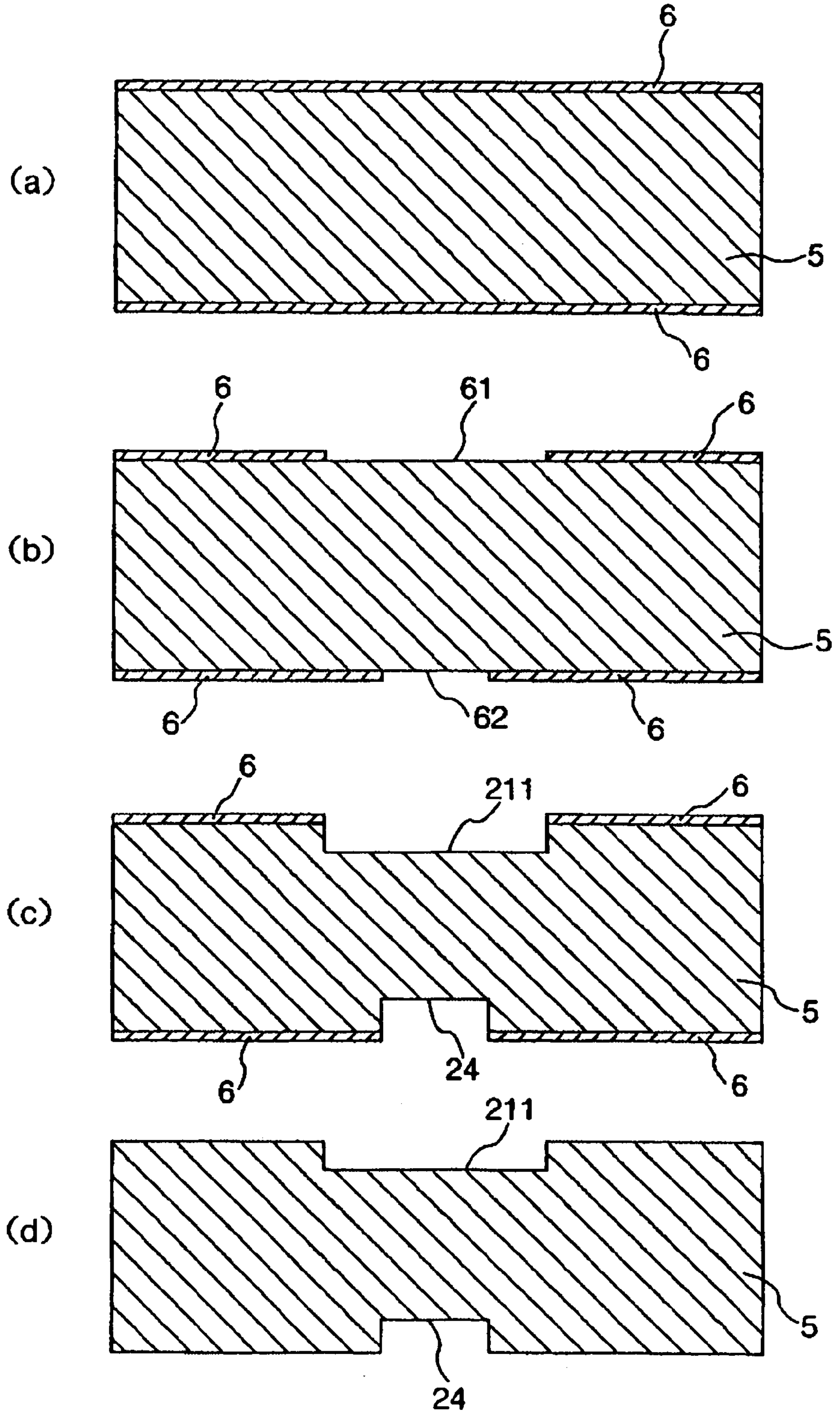
FIG. 3 is a step diagram which shows a method for manufacturing the optical tunable filter according to the present invention.

<2> Next, as shown in FIG. 3(*a*), a mask layer 6 is formed on each of the upper and lower surfaces of the transparent substrate 5 (hereinafter, the mask layer 6 provided on the upper surface of the transparent substrate 5 will be also referred to as "upper mask layer 6", and the mask layer 6 provided on the lower surface of the transparent substrate 5 will be also referred to as "lower mask layer 6"), that is, the transparent substrate 5 is subjected to masking. Examples of the constituent material of the mask layer 6 include: metals such as Au/Cr, Au/Ti, Pt/Cr, and Pt/Ti; silicon such as polycrystalline silicon (polysilicon) and amorphous silicon; and silicon nitride. The use of silicon for the mask layer 6 improves adhesion between the mask layer 6 and the transparent substrate 5. The use of metal for the mask layer 6 makes it easier to visually identify the mask layer 6.

The thickness of the mask layer 6 is not limited to any specific value, but is preferably in the range of about 0.01 to 1 μm, more preferably in the range of about 0.09 to 0.11 μm. If the mask layer 6 is too thin, there is a case where the mask layer 6 cannot satisfactorily protect the transparent substrate 5. On the other hand, if the mask layer 6 is too thick, there is a case where the mask layer 6 is easily peeled off due to the internal stress of the mask layer 6. The mask layer 6 can be formed by, for example, a chemical vapor deposition method (CVD method), a sputtering method, a vapor-phase deposition method such as a deposition method, or a plating method.

<3> Next, as shown in FIG. 3(*b*), openings 61 and 62 are formed in the mask layer 6. The opening 61 is formed at a position where the first concave portion 211 is to be formed, for example. The shape (planar shape) of the opening 61 corresponds to the shape (planar shape) of the first concave portion 211 to be formed. The opening 62 is formed in the lower mask layer 6 at a position opposite to a position where the first concave portion 211 is to be formed, for example. The shape (planar shape) of the opening 62 corresponds to the shape (planar shape) of the second concave portion 221 to be formed in the following step.

These openings 61 and 62 can be formed by, for example, a photolithography method. Specifically, a resist layer (not shown in the drawings) having a pattern corresponding to the opening 61 is formed on the upper mask layer 6, and a resist layer (not shown in the drawings) having a pattern corresponding to the opening 62 is formed on the lower mask layer 6. Next, a part of the upper mask layer 6 is removed by using the resist layer as a mask, and then the resist layer is removed. The same is carried out for the lower mask layer 6. In this way, the opening 61 and 62 are formed. In this regard, it is to be noted that a part of the mask layer 6 can be removed by, for example, dry etching using a CF gas or a chlorine-based gas, or immersion in a stripping solution such as a mixed aqueous solution of hydrofluoric acid and nitric acid or an aqueous alkali solution (that is, wet etching).

<4> Next, as shown in FIG. 3(*c*), the first concave portion 211 and the light entrance portion 24 are formed in the transparent substrate 5. Examples of a method for forming the first concave portion 211 include etching methods such as a dry etching method and a wet etching method, and the like. For example, by subjecting the transparent substrate 5 to etching, the opening 61 and the opening 62 are isotropically etched so that the first concave portion 211 and the light entrance portion 24 each having a cylindrical shape are formed, respectively.

Particularly, wet etching makes it possible to form the first concave portion 211 and the light entrance portion 24 each having a more ideal cylindrical shape. As an etchant to be used for wet etching, a hydrofluoric acid-based etchant is preferably used, for example. At this time, by adding alcohol (especially, polyhydric alcohol) such as glycerin to the etchant, it is possible to obtain a first concave portion 211 having a very smooth surface.

<5> Next, the mask layer 6 is removed. The mask layer 6 can be removed by, for example, immersion in a stripping solution (that is a solution for removal) such as an aqueous alkali solution (e.g., an aqueous tetramethyl ammonium hydroxide solution), a mixed aqueous solution of hydrochloric acid and nitric acid, a mixed aqueous solution of hydrofluoric acid and nitric acid (that is, wet etching), or dry etching using a CF gas or a chlorine-based gas.

Particularly, by immersing the transparent substrate 5 in such a solution for removal, it is possible to easily and efficiently remove the mask layer 6. In this way, as shown in FIG. 3(*d*), each of the first concave portion 211 and the light entrance portion 24 is formed in the transparent substrate 5 at a predetermined position. The second concave portion 221 can be formed in the same manner as described above with reference to the first concave portion 211.

Figure 4:
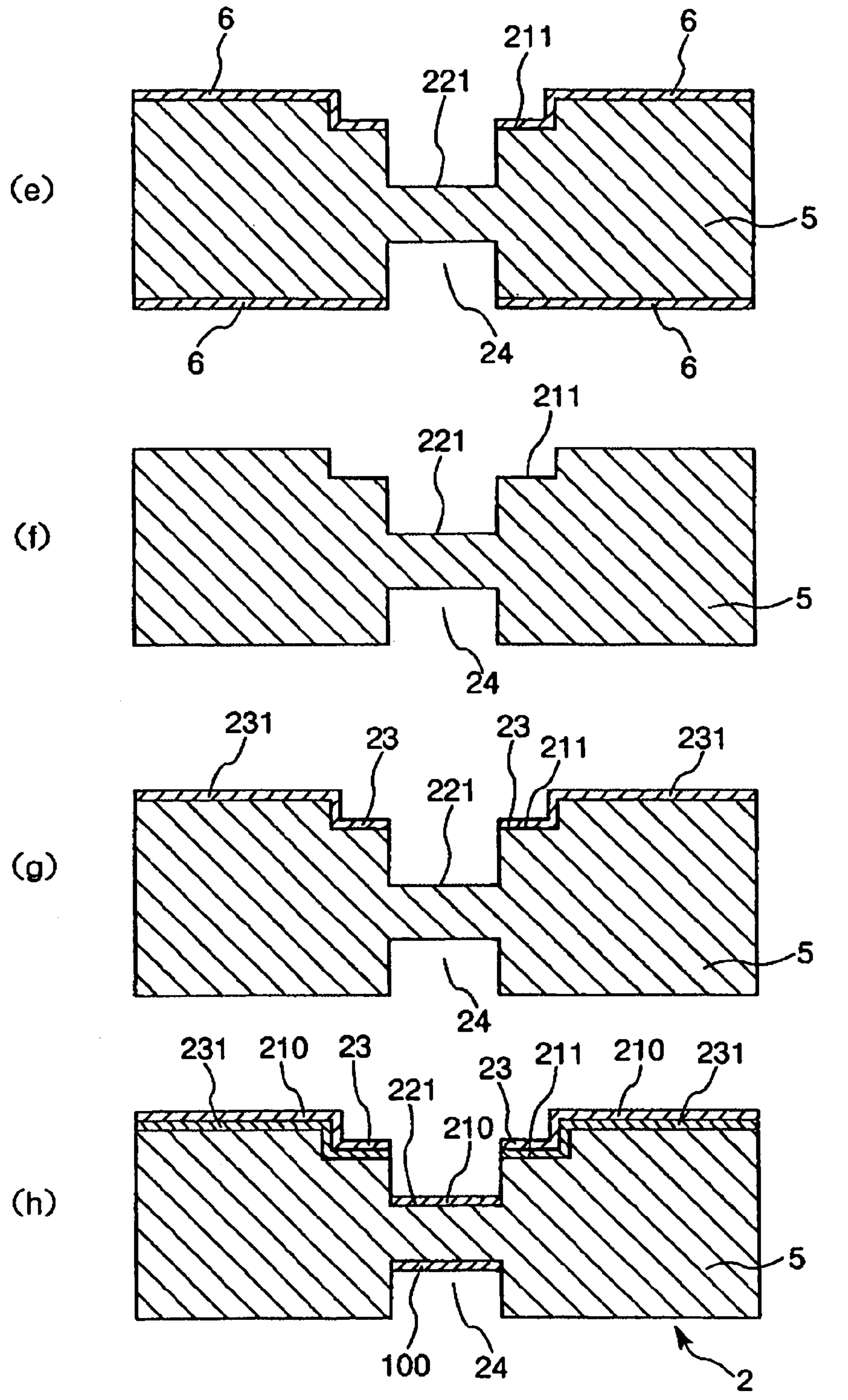
FIG. 4 is a step diagram which shows the method for manufacturing the optical tunable filter according to the present invention (continued from FIG. 3).

As shown in FIG. 4(*e*), it is preferred that when the second concave portion 221 is formed, at least one of the area of an opening to be formed and the etching conditions in the step <4> (e.g., etching time, etching temperature, and composition of the etchant) is made different from the conditions for forming the first concave portion 211. By allowing a part of the conditions for forming the second concave portion 221 to be different from the conditions for forming the first concave portion 211, it is possible to easily form the second concave portion 221 having a diameter different from that of the first concave portion 211.

In this way, as shown in FIG. 4(*f*), each of the first concave portion 211, the second concave portion 221, and the light entrance portion 24 is formed in the transparent substrate 5 at a predetermined position.

In the following steps, the drive electrode 23 and the conductive layer 231 are formed on the surface of the transparent substrate 5.

<6> Specifically, a mask layer (not shown in the drawings) is formed on the upper surface of the transparent substrate 5 and the surface of the first concave portion 211. Examples of the constituent material of the drive electrode 23 and the conductive layer 231 (that is, the constituent material of the mask layer) include: metals such as Cr, Al, Al alloys, Ni, Zn, and Ti; resins in which carbon or titanium is dispersed; silicon such as polycrystalline silicon (polysilicon) and amorphous silicon; silicon nitride; and transparent conductive materials such as ITO. The drive electrode 23 and the conductive layer 231 preferably have a thickness in the range of 0.1 to 0.2 μm, for example. The drive electrode 23 and the conductive layer 231 can be formed by a vapor deposition method, a sputtering method, an ion plating method or the like.

<7> as shown in FIG. 4(*g*), the drive electrode 23 and the conductive layers 231, 231 are formed using the mask layer. The drive electrode 23 is provided on the upper surface of the first concave portion 211, and the conductive layers 231, 231 is provided on the upper surface of the transparent substrate 5 so as to be continuous with the drive electrode 23. In this case, it is preferred that the shape (planar shape) of the drive electrode 23 corresponds to the shape (planar shape) of the first concave portion 211.

The drive electrode 23 and the conductive layer 231 can be formed by, for example, a photolithography method. Specifically, a resist layer (not shown in the drawings) having a pattern corresponding to the drive electrode 23 and the conductive layer 231 is formed on the mask layer. Next, a part of the mask layer is removed using the resist layer as a mask. Then, the resist layer is removed. In this way, the drive electrode 23 and the conductive layer 231 are formed. In this regard, it is to be noted that a part of the mask layer can be removed by, for example, dry etching using a CF gas or a chlorine-based gas, or immersion in a stripping solution such as a mixed aqueous solution of hydrofluoric acid and nitric acid or an aqueous alkali solution (that is, wet etching).

<8> Next, as shown in FIG. 4(*h*), on the upper surface of the first concave portion 211, the surface of the drive electrode 23 and the surface of the conductive layers 231, 231, the second reflective film 210 is provided. Further, on the surface of the light entrance portion 24, the antireflective film 100 is provided. In this manufacturing method, each of the antireflective film 100, the first reflective film 200, and the second reflective film 210 is formed from a multilayer film.

Examples of the constituent material of the multilayer film include $SiO_2$, $Ta_2O_5$, and SiN. By alternately laminating layers made of such materials, it is possible to obtain a multilayer film having a predetermined thickness. Each of the first reflective film 200 and the second reflective film 210 preferably has a thickness of 0.1 to 12 μm.

In this way, a base substrate (second substrate) 2 in which each of the first concave portion 211, the second concave portion 221, the drive electrode 23, the second reflective film 210, and the antireflective film 100 is provided on the transparent substrate 5 at a predetermined position can be obtained. Such a base substrate 2 can be used for an optical tunable filter.

Hereinafter, a method for forming the movable portion 31, the supporting portions 32, and the current-carrying portion 33 by the use of wafer, and a method for manufacturing an optical tunable filter by the use of the formed movable portion 31 and the base substrate 2 for use in an optical tunable filter will be described with reference to FIG. 5 and FIG. 6.

First, a wafer 7 is prepared for forming the movable portion 31. Such a wafer 7 can be formed and prepared in the following manner, for example. It is preferred that this wafer 7 has a property of being able to make the surface thereof a mirror-finished surface. From such a viewpoint, as the wafer 7, an SOI (Silicon on Insulator) substrate, an SOS (Silicon on Sapphire) substrate, or a silicon substrate can be used, for example.

In this manufacturing method, an SOI substrate is used as the wafer 7. The wafer 7 is formed so as to have a laminated structure including three layers, an Si base layer 71, an $SiO_2$ layer 72, and an upper Si layer (active layer) 73. The thickness of the wafer 7 is not limited to any specific value, but particularly, the upper Si layer 73 preferably has a thickness in the range of about 10 to 100 μm.

Figure 5:
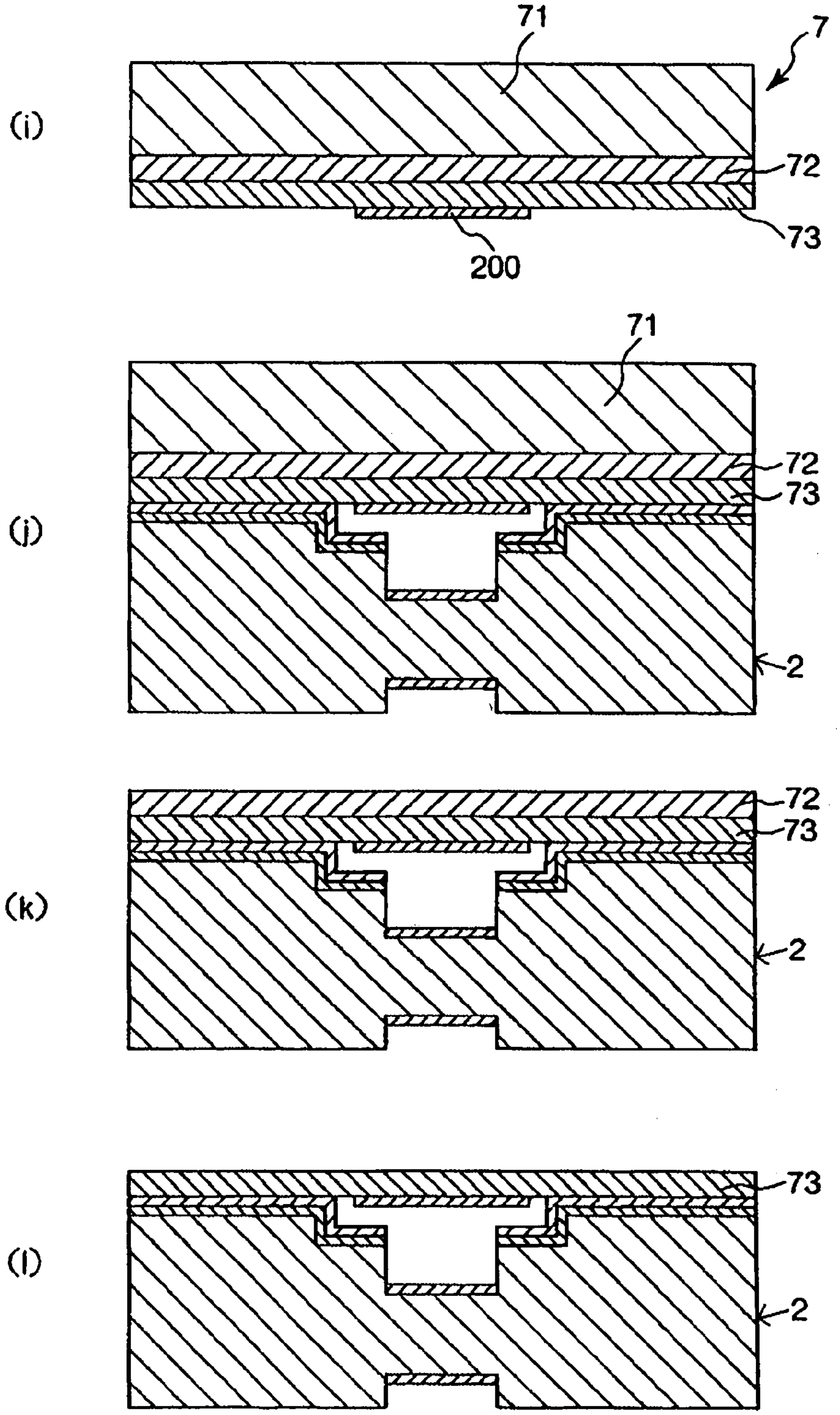
FIG. 5 is a step diagram which shows the method for manufacturing the optical tunable filter according to the present invention (continued from FIG. 4).

<9> First, as shown in FIG. 5(*i*), the first reflective film 200 is provided on the lower surface of the upper Si layer 73 so that the first reflective film 200 can face the second concave portion 221 after the bonding step described below.

<10> Next, as shown in FIG. 5(*j*), the upper Si layer 73 of the wafer 7 is bonded to the surface of the base substrate 2, which is a surface where the second concave portion 221 is provided. Such bonding can be carried out by anodic bonding, for example.

Anodic bonding is carried out in the following manner, for example. First, the base substrate 2 is connected to the negative terminal of a direct-current power supply (not shown in the drawings) and the upper Si layer (active layer) 73 is connected to the positive terminal of the direct-current power supply. Then, a voltage is applied across them with the base substrate 2 being heated. Heating of the base substrate 2 facilitates the movement of Na+ in the base substrate 2 so that the surface of the base substrate 2 to be bonded is negatively charged and the surface of the wafer 7 to be bonded is positively charged. As a result, the base substrate 2 and the wafer 7 are firmly bonded.

In this manufacturing method, anodic bonding is employed, but a method for bonding is not limited thereto. For example, hot pressing bonding, bonding with an adhesive, or bonding using low-melting glass may be employed.

<11> Next, as shown in FIG. 5(*k*), the Si base layer 71 is removed by etching or polishing. As for a method for etching, wet etching or dry etching can be used, for example, but dry etching is preferably used. In both cases, the $SiO_2$ layer 72 functions as a stopper when the Si base layer 71 is removed. In this case, since dry etching does not use an etchant, it is possible to properly prevent the upper Si layer 73 facing the drive electrode 23 from being damaged. This improves the manufacturing yield of the optical tunable filter 1.

<12> Next, as shown in FIG. 5(*l*), the $SiO_2$ layer 72 is removed by etching. At this time, an etchant containing hydrofluoric acid is preferably used. By using such an etchant, it is possible to properly remove the $SiO_2$ layer 72, thereby enabling a desired upper Si layer 73 to be obtained. In this regard, it is to be noted that in a case where the wafer 7 is made of Si element and has a thickness suited to carrying out the following steps, the steps <11> and <12> can be omitted, thereby enabling the process for manufacturing the optical tunable filter 1 to be simplified.

<13> Next, a resist layer (not shown in the drawings) having a pattern corresponding to the shape (planar shape) of the movable portion 31 and the supporting portions 32 is formed. Next, as shown in FIG. 6(*m*), the upper Si layer 73 is subjected to etching by dry etching, especially by ICP etching to form a through hole 8. In this way, the movable portion 31, the supporting portions 32 (not shown in the drawing), and the current-carrying portion 33 are formed.

In the step <13>, ICP etching is carried out. Specifically, etching using an etching gas and formation of a protective film by the use of a deposition gas are alternately repeated to form the movable portion 31. As an example of the etching gas, $SF_6$ can be mentioned. As an example of the deposition gas, $C_4F_8$ can be mentioned.

By carrying out ICP etching, it is possible to subject only the upper Si layer 73 to etching. Further, since ICP etching is dry etching, it is possible to reliably form the movable portion 31, the supporting portions 32, and the current-carrying portion 33 with high accuracy without influence on portions other than the upper Si layer 73. As described above, since dry etching, especially ICP etching is employed when the movable portion 31, the supporting portions 32, and the current-carrying portion 33 are formed, the movable portion 31 can be easily and reliably formed with high accuracy.

In the method according to the present invention, the movable portion 31, the supporting portions 32 and the current-carrying portion 33 may be formed by a dry etching method other than that described above. Alternatively, the movable portion 31, the supporting portions 32 and the current-carrying portion 33 may be formed by a method other than dry etching.

Figure 6:
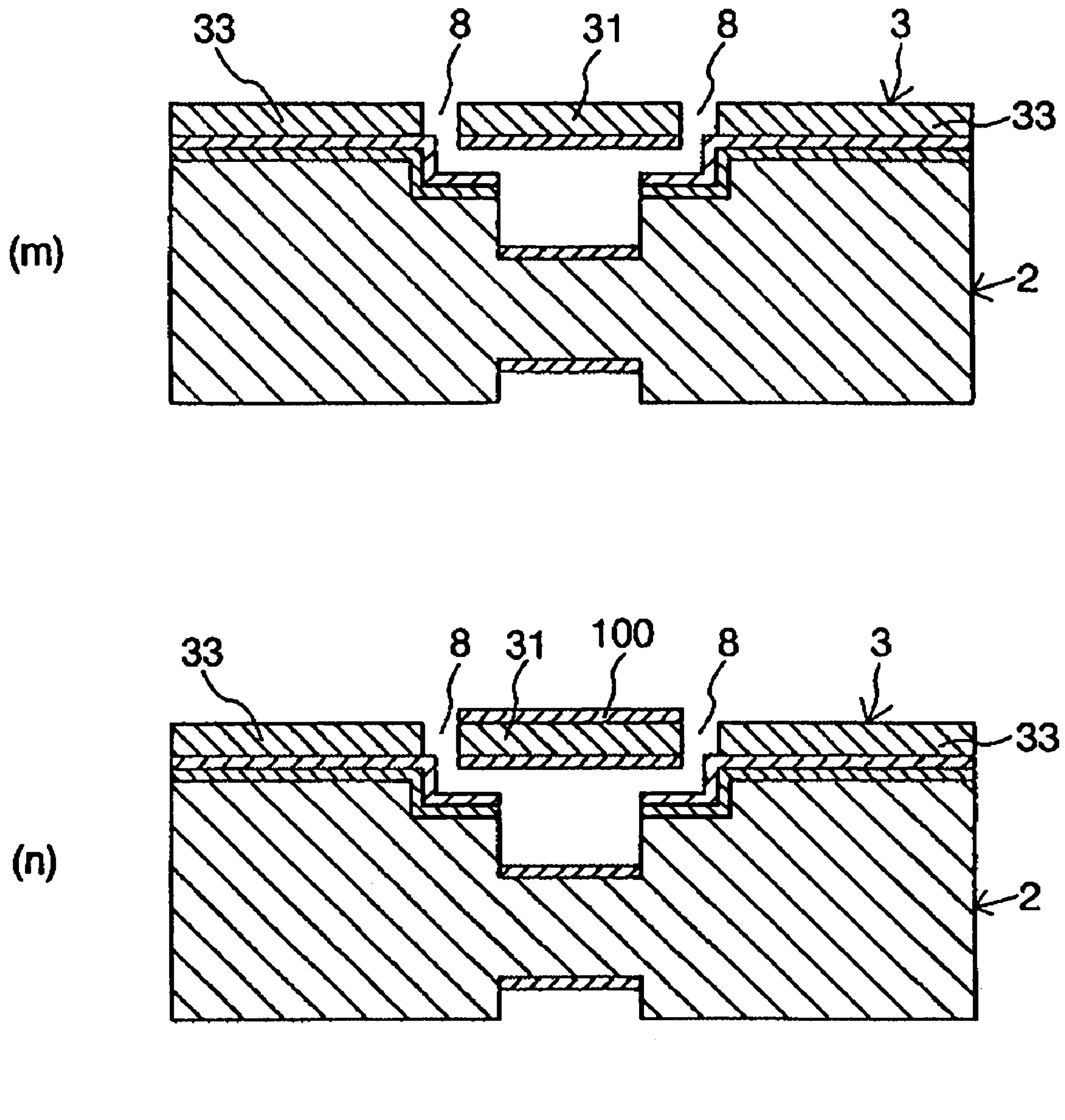
FIG. 6 is a step diagram which shows the method for manufacturing the optical tunable filter according to the present invention (continued from FIG. 5).

<14> Next, as shown in FIG. 6(*n*), the antireflective film 100 is formed on the upper surface of the movable portion 31. Through the steps described above, the optical tunable filter 1 as shown in FIG. 1 is manufactured. It should be noted that, in this manufacturing method, the conductive layer is formed by patterning, but it may be formed in a recess provided in the transparent substrate.

According to the present invention, the first gap 21 (that is, a gap for driving the movable portion 31) and the second gap 22 (that is, a gap having the function of passing through or reflecting light which has entered the optical tunable filter 1) are provided in the base substrate 2 (that is, the first gap 21 and the second gap 22 are provided by utilizing the same substrate) so that the structure of the optical tunable filter 1 can be simplified. Further, it is also possible to simplify the step for forming the first gap 21 and to reduce the size of the optical tunable filter 1.

According to the present invention, a release hole is not necessary for forming the movable portion so that the manufacturing process of the optical tunable filter can be simplified. In addition, since an area where Coulomb force acts is not reduced, a voltage to be applied can be lowered.

In the present embodiment, the antireflective film 100, the first reflective film 200, and the second reflective film 210 are formed as insulating films. This makes it possible to prevent sticking from occurring between the movable portion 31 and the drive electrode 23. That is, a reliable insulating structure can be provided between the movable portion 31 and the drive electrode 23.

The present invention is not limited to the embodiment of the optical tunable filter shown in the drawings, and so long as the same functions are achieved, it is possible to make various changes and additions to each portion of the optical tunable filter of the present invention.

For example, in the above embodiment, the optical tunable filter has the antireflective film 100, the first reflective film 200 and the second reflective film 210 which function as insulating films, but the present invention is not limited thereto. For example, insulating films may be separately provided. In such a case, an $SiO_2$ layer obtained by thermal oxidation or an $SiO_2$ layer formed by TEOS-CVD may be used as an insulating film.

This application claims priority to Japanese Patent Application No. 2003-330619 filed Sep. 22, 2003, which is hereby expressly incorporated by reference herein in its entirety.

What is claimed is:

1. An optical tunable filter, comprising:

a first substrate having a light transmitting property, the first substrate including a movable portion, a current-carrying portion provided around the movable portion through predetermined spacing and supporting portions provided between the movable portion and the current-carrying portion for connecting the movable portion with respect to the current-carrying portion and for elastically supporting the movable portion with respect to the current-carrying portion, the current-carrying portion adapted to supply an electrical current to the movable portion through the supporting portions, wherein the movable portion, the supporting portions and the current-carrying portion are integrally formed from the same material by means of an etching method so that the current-carrying portion and the movable portion have substantially the same thickness;

a second substrate having a light transmitting property, the second substrate being provided so as to be opposed to the first substrate;

a first gap and a second gap which are respectively provided between the movable portion and the second substrate;

an interference portion which causes interference of incident light between the movable portion and the second substrate through the second gap;

a first reflective film provided on a surface of the movable portion which defines the second gap and a second reflective film provided on a surface of the second substrate which faces the movable portion and defines the second gap; and a driving portion for changing a distance of the second gap by displacing the movable portion with respect to the second substrate using the first gap, the driving portion including a driving electrode provided on the second substrate to provide the first gap between the driving electrode and the movable portion so that the movable portion is movable up and down by a Coulomb force generated therebetween when a voltage is applied between the movable portion and the driving electrode.

2. The optical tunable filter claimed in claim 1, wherein the second substrate has a surface facing the movable portion, in which the surface of the second substrate is formed with a first concave portion corresponding to the first gap and a second concave portion corresponding to the second gap, and the second concave portion is formed so as to be deeper than the first concave portion.

3. The optical tunable filter claimed in claim 1, wherein the first concave portion is provided around the second concave portion so as to be continuous with the second concave portion.

4. The optical tunable filter claimed In claim 1, wherein the first gap and the second gap are formed by an etching method.

5. The optical tunable filter claimed in claim 1, wherein the first substrate is made of silicon.

6. The optical tunable filter claimed in claim 1, wherein the movable portion has a substantially circular shape in a plan view.

7. The optical tunable filter claimed In claim 1, wherein the second substrate is made of glass.

8. The optical tunable filter claimed in claim 7, wherein the glass contains alkali metal.

9. The optical tunable filter claimed in claim 1, wherein each of the first reflective film and the second reflective film is formed from a multiplayer film.

10. The optical tunable filter claimed in claim 1, wherein the first reflective film has an insulating property.

11. The optical tunable filter claimed in claim 1, wherein an antireflective film is provided on at least one of the other surface of the movable portion and the other surface of the second substrate.

12. The optical tunable filter claimed in claim 11, wherein the antireflective film is formed from a multiplayer film.

13. The optical tunable filter claimed in claim 1, wherein the second substrate includes a light transmitting portion through which light enters and/or from which light is emitted, the light transmitting portion being provided on the other surface of the second substrate.

14. The optical tunable filter claimed in claim 1, wherein the current-carrying portion and the movable portion are positioned on the same horizontal plane when no voltage is applied.

15. A method for manufacturing an optical tunable filter, wherein the optical tunable filter comprises:

a first substrate having a light transmitting property, the first substrate including a movable portion, a current-carrying portion provided around the movable portion through a predetermined spacing and supporting portions provided between the movable portion and the current-carrying portion for connecting the movable portion with respect to the current-carrying portion and for elastically supporting the movable portion with respect to the current-carrying portion, the current-carrying portion adapted to supply an electrical current to the movable portion through the supporting portions;

a second substrate having a light transmitting property, the second substrate being provided so as to be opposed to the first substrate;

a first gap and a second gap which are respectively provided between the movable portion of the first substrate and the second substrate;

an interference portion which causes interference of incident light between the movable portion and the second substrate through the second gap;

a first reflective film provided on a surface of the movable portion which defines the second gap and a second reflective film provided on a surface of the second substrate which faces the movable portion and defines the second gap; and a driving portion for changing a distance of the second gap by displacing the movable portion with respect to the second substrate using the first gap, the driving portion including a driving electrode provided on the second substrate to provide the first gap between the driving electrode and the movable portion so that the movable portion is movable up and down by a Coulomb force generated therebetween when a voltage is applied between the movable portion and the driving electrode;

wherein the manufacturing method is characterized in that the movable portion, the supporting portions and the current-carrying portion of the first substrate are integrally formed from the same material by means of an etching method so that the current-carrying portion and the movable portion have substantially the same thickness, and the first gap and the second gap are also formed by an etching method.

16. The method as claimed in claim 15, wherein the current-carrying portion and the movable portion are positioned on the same horizontal plane when no voltage is applied.

* * * * *